(12) United States Patent
Covington, Jr. et al.

(10) Patent No.: US 9,090,334 B2
(45) Date of Patent: Jul. 28, 2015

(54) MECHANICAL AND MAGNETIC CONTROL SYSTEM FOR MAGNETORHEOLOGICAL ACTUATORS

(71) Applicant: Bell Helicopter Textron Inc., Fort Worth, TX (US)

(72) Inventors: Charles Eric Covington, Jr., Colleyville, TX (US); Brady G. Atkins, Irving, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/286,173

(22) Filed: May 23, 2014

(65) Prior Publication Data

US 2015/0083868 A1    Mar. 26, 2015

Related U.S. Application Data

(60) Provisional application No. 61/882,901, filed on Sep. 26, 2013.

(51) Int. Cl.
| B64C 13/40 | (2006.01) |
| B64C 19/00 | (2006.01) |
| B64C 27/00 | (2006.01) |
| F16D 27/10 | (2006.01) |

(52) U.S. Cl.
CPC .............. *B64C 19/00* (2013.01); *B64C 27/00* (2013.01); *F16D 27/10* (2013.01)

(58) Field of Classification Search
None
See application file for complete search history.

(56) References Cited

U.S. PATENT DOCUMENTS

| 6,827,174 | B2 * | 12/2004 | Chernoff et al. ............... 180/333 |
| 6,869,375 | B2 * | 3/2005 | Welsh ........................... 474/153 |
| 6,880,855 | B2 * | 4/2005 | Chernoff et al. ............... 280/778 |
| 7,306,535 | B2 * | 12/2007 | Menjak et al. .................. 475/29 |
| 7,958,801 | B2 * | 6/2011 | Frederickson ................ 74/572.2 |
| 8,044,629 | B2 * | 10/2011 | Fallahi ......................... 318/611 |
| 8,210,942 | B2 * | 7/2012 | Shimabukuro et al. ......... 463/30 |
| 8,413,533 | B2 * | 4/2013 | Rake et al. .................. 74/473.12 |
| 8,573,092 | B2 * | 11/2013 | Kramlich ......................... 74/553 |
| 2008/0150458 | A1 * | 6/2008 | Ryynanen et al. ............. 318/362 |
| 2011/0163769 | A1 * | 7/2011 | Herrera et al. ................ 324/691 |
| 2012/0152053 | A1 * | 6/2012 | Kondo et al. ................... 74/513 |
| 2013/0180350 | A1 * | 7/2013 | Kraus et al. .................... 74/108 |
| 2013/0229272 | A1 * | 9/2013 | Elliott ........................ 340/407.2 |
| 2014/0137679 | A1 * | 5/2014 | Pittini et al. ................ 74/89.23 |
| 2014/0366675 | A1 * | 12/2014 | Gosselin et al. ........... 74/490.05 |

* cited by examiner

*Primary Examiner* — Christopher P Ellis
*Assistant Examiner* — Medhat Badawi
(74) *Attorney, Agent, or Firm* — Bell Helicopter Textron Inc

(57) ABSTRACT

In some embodiments, a method of provided boosted actuation to an aircraft flight control device includes receiving an input from a pilot input device via a mechanical input member, providing mechanical energy to a driving member of a controlled-slippage actuator, and varying the strength of a magnetic field applied to a magnetorheological (MR) fluid disposed between the driving member and a driven member of the controlled-slippage actuator based on the relative positions of the mechanical input member and a mechanical output member that is in mechanical communication with the driven member and the aircraft flight control device.

20 Claims, 5 Drawing Sheets

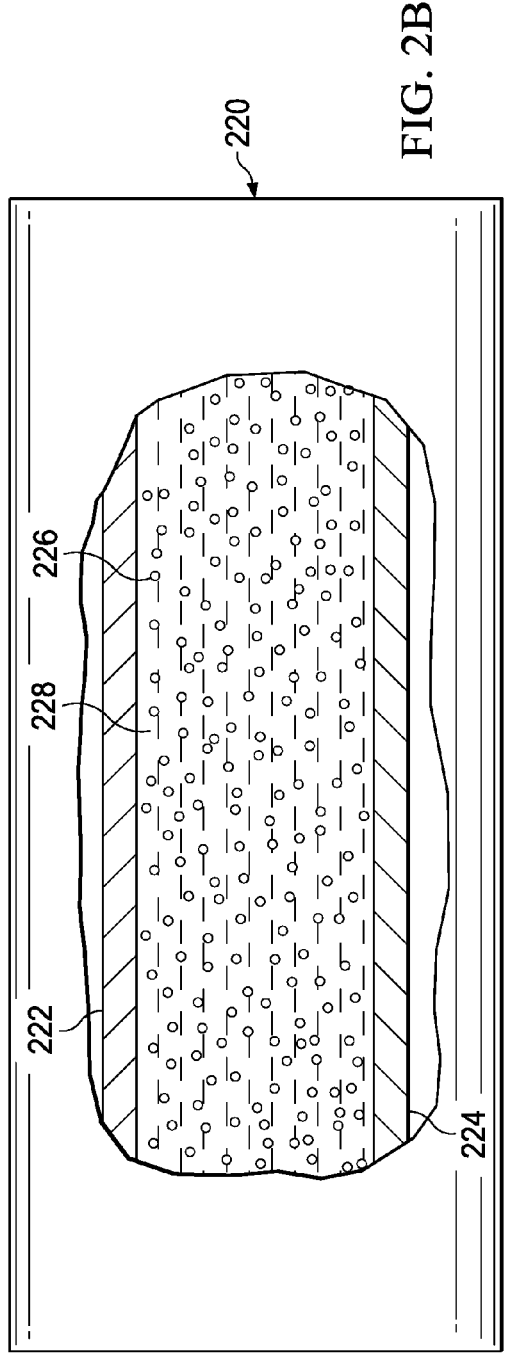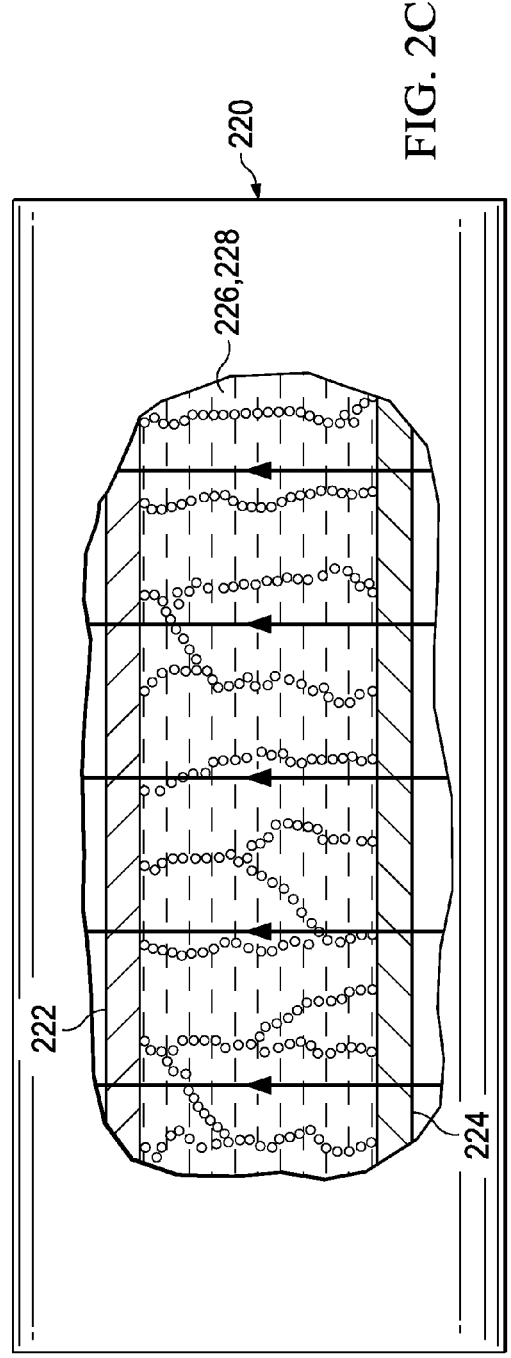

US 9,090,334 B2

MECHANICAL AND MAGNETIC CONTROL SYSTEM FOR MAGNETORHEOLOGICAL ACTUATORS

RELATED APPLICATIONS

Pursuant to 35 U.S.C. §119 (e), this application claims priority to U.S. Provisional Patent Application Ser. No. 61/882,901, MECHANICAL AND MAGNETIC CONTROL SYSTEM FOR MAGNETORHEOLOGICAL ACTUATORS, filed Sep. 26, 2013. U.S. Provisional Patent Application Ser. No. 61/882,901 is hereby incorporated by reference.

TECHNICAL FIELD

This invention relates generally to actuation systems, and more particularly, to a mechanical and magnetic control systems for magnetorheological actuators.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust to counter the torque effect created by the main rotor system.

SUMMARY

Particular embodiments of the present disclosure may provide one or more technical advantages. A technical advantage of one embodiment may include the capability to provide boost actuation without relying on a hydraulic power source. A technical advantage of one embodiment may include the capability to control boost actuation position without relying on control electronics (such as may be found in a fly-by-wire flight control system). A technical advantage of one embodiment may include the capability to reduce mechanical failures in a boost actuation system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2B shows a magnetorheological (MR) fluid clutch actuator according to one example embodiment that may be incorporated into a flight control system such as the example flight control system of FIG. 2A;

FIG. 2C shows the MR fluid clutch actuator of FIG. 2B when subject to a magnetic flux;

DETAILED DESCRIPTION OF THE DRAWINGS

Figure 1:
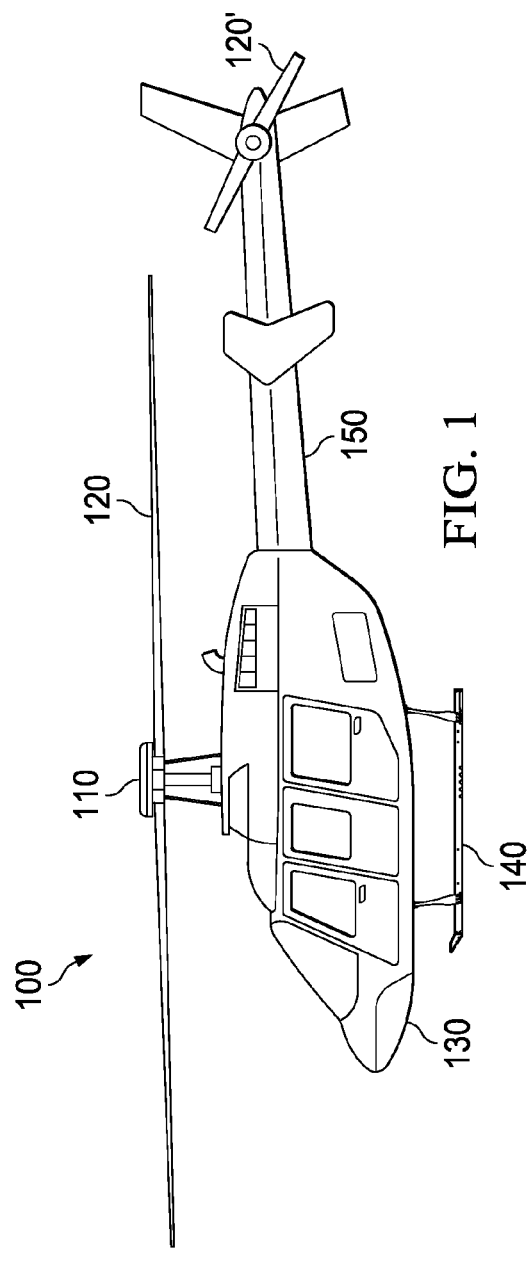
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

As stated above, a control system may selectively control the pitch of each blade 120 in order to selectively control direction, thrust, and lift of rotorcraft 100. In some embodiments, a control system may receive inputs (e.g., from a pilot, flight computer, and/or other flight control equipment) and change the pitch of each blade 120 based on these inputs. Example embodiments of a control system for selectively controlling the pitch of blades 120 may include mechanical, fly-by-wire, and/or other equipment for receiving inputs and changing the pitch of blades 120 based on these inputs.

Figure 2A:
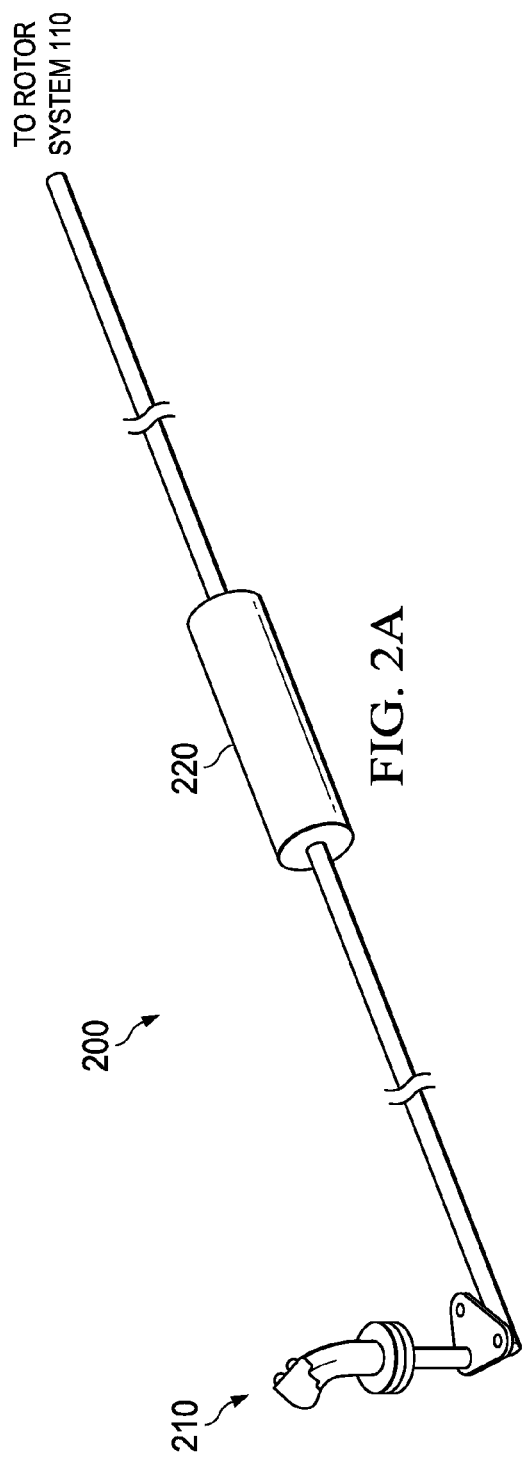
FIG. 2A shows an example flight control system according to one example embodiment that may be incorporated into an aircraft such as the rotorcraft of FIG. 1.

FIG. 2A shows an example control system 200 according to one example embodiment. In the example of FIG. 2A, control system 200 represents a mechanical control system that features an input device 210, a boost actuator 220, and a variety of linkages mechanically communicating inputs from input device 210 towards rotor system 110.

Boost actuator 220 may represent a device configured to provide an output position proportional to a pilot input position but at increased (boosted) force output. In the example of FIG. 2A, boost actuator 220 is located in series with the mechanical linkage between the pilot's cockpit controls and the main rotor and tail rotor flight control actuators that control blade pitch (e.g., by controlling the helicopter swash plates).

One example of a boost actuator may include a hydraulic boost actuator. A hydraulic boost actuator utilizes pressurized hydraulic fluid to provide the force necessary to operate against external flight loads. A hydraulic boost actuator may also provide mechanically implemented and reliable position regulation of the output relative to the pilot command. Hydraulic boost actuators, however, may require complex hydraulic systems to provide the hydraulic power source. Accordingly, teachings of certain embodiments recognize the capability to provide boost actuation without relying on a hydraulic power source.

For example, teachings of certain embodiments recognize the capability to utilize magnetorheological (MR) fluid in a boost actuator such as boost actuator 220. MR fluid is a type of smart fluid that may be disposed in a carrier fluid, usually a type of oil. When subjected to a magnetic field, the fluid may increase its apparent viscosity, potentially to the point of becoming a viscoelastic solid. The yield stress of the fluid when in its active ("on") state may be controlled by varying the magnetic field intensity. Accordingly, the fluid's ability to transmit force can be controlled by varying magnetic field.

As will be explained in greater detail below, a MR fluid clutch actuator may provide a boosted output in response to an input received from a pilot (or other input source). For example, FIGS. 2B and 2C show example conceptual views of a MR fluid clutch actuator 220 according to one example embodiment. The example MR fluid clutch actuator 220 features bodies 222 and 224 separated by an MR fluid 226 disposed in a carrier fluid 228. In the example of FIGS. 2B and 2C, body 222 may be moving by means of a power source, the magnetic field density may be in communication with input device 210, and body 224 may be in mechanical communication with devices associated with rotor system 110.

FIG. 2B shows MR fluid clutch actuator 220 when the MR fluid 226 is subject to little or no magnetic flux, whereas FIG. 2C shows MR fluid clutch actuator 220 when the MR fluid 226 is subject to a magnetic flux. Accordingly, the example of FIG. 2B may allow increased movement between bodies 222 and 224, whereas the example of FIG. 2C may restrict movement between bodies 222 and 224.

Accordingly, MR fluid clutch actuator 220 may vary the amount of force provided to body 224 in response to a received input by changing the amount of magnetic flux received by MR fluid 226. In addition, MR fluid clutch actuator 220 may be less prone to component failures than some other actuators because MR fluid 226 and carrier fluid 228 may prevent at least some friction between bodies 222 and 224.

Figure 3:
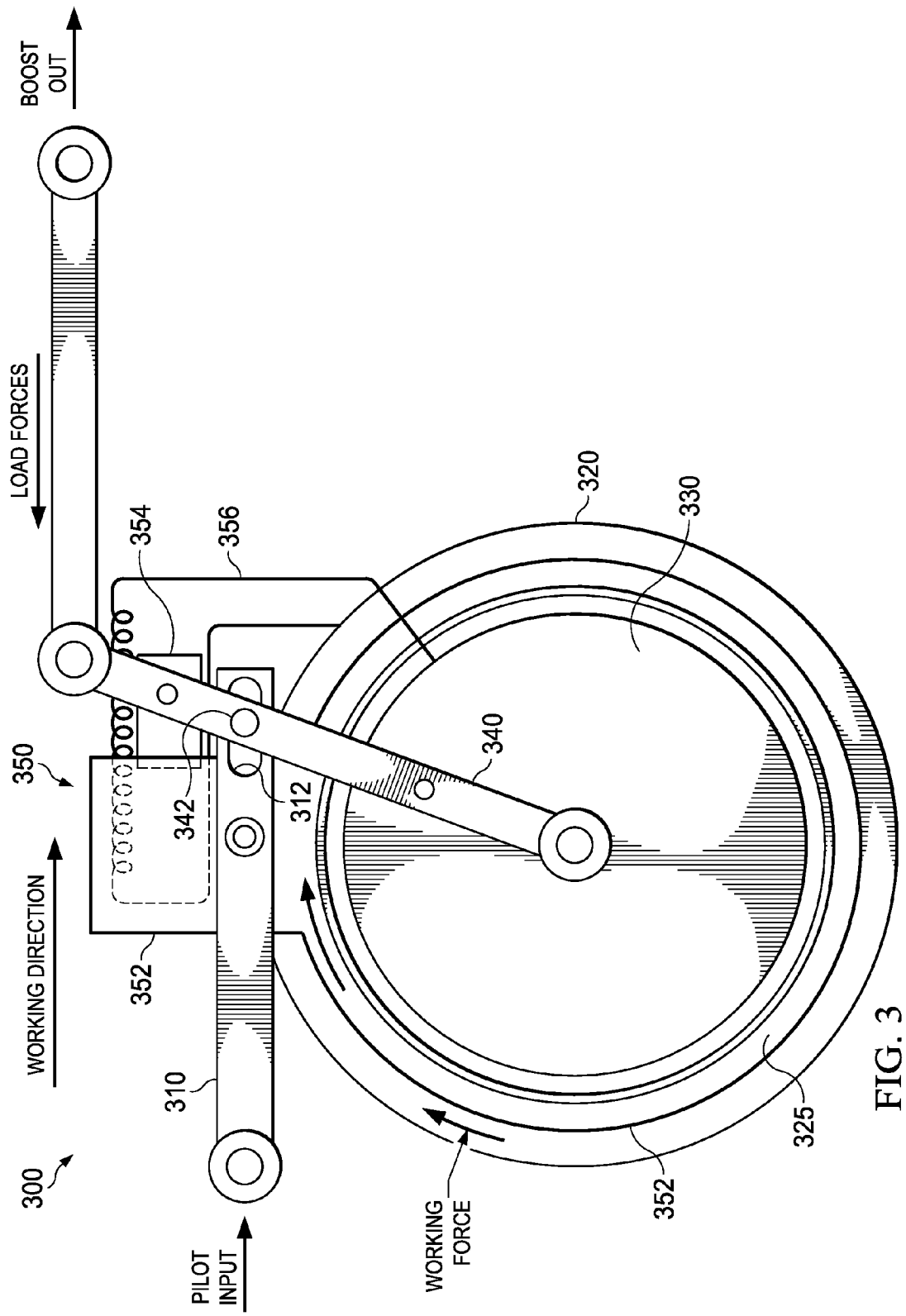
FIG. 3 shows an MR fluid boost actuator according to one example embodiment that may be incorporated into a flight control system such as the example flight control system of FIG. 2A.

Teachings of certain embodiments recognize that an MR fluid clutch actuator, such as MR fluid clutch actuator 220, may provide a "boosted" output force by applying a working force to the output body. For example, FIG. 3 shows an MR fluid boost actuator 300 according to one example embodiment. MR fluid boost actuator 300 features an input member 310, a driving member 320, a driven member 330, an output member 340, and a magnetic field system 350, which includes a magnetic circuit 352 and a magnet 354 (which may represent, for example, a permanent magnet, an electromagnetic, or any other suitable magnet). MR fluid 325 (as well as carrier fluid) may be disposed between driving member 320 and driven member 330.

In operation, according to one example embodiment, a power source (not shown) causes driving member 320 to rotate. MR fluid 325 transmits at least some rotational energy (torque) to driven member 330, thereby causing driven member 330 to rotate. Magnetic field system 350 subjects MR fluid 325 to a magnetic field that, if changed, may change the viscosity of MR fluid 325. Changing the viscosity of MR fluid 325, in turn, may change the amount of rotational energy transferred from driving member 320 to driven member 330.

Accordingly, in this example, the amount of rotational energy transferred to driven member 330 may be regulated by controlling the amount of magnetic field generated by magnetic field system 350. In the example of FIG. 3, the amount of magnetic field generated may depend on the relative positions of input member 310, which may move in response to an input received from a pilot or another input source, and output member 320, which may be rigidly coupled to driven member 330 and be in mechanical communication with components associated with rotor system 110. In this example, magnetic circuit 352 is coupled to input member 310, and magnet 354 is coupled to output member 340. When input member 310 and output member 340 move magnetic circuit 352 and magnet 354 closer together or further part, magnetic field system 350 may generate a larger or smaller magnetic field that changes the viscosity of MR fluid 325.

Accordingly, teachings of certain embodiments recognize that MR fluid boost actuator 300 may control the amount of output force based on movements of input member 310 and output member 340. In this manner, MR fluid boost actuator 300 may operate as a feedback control loop by changing the magnetic field based on a position "error" between the input (e.g., the position of input member 310) and the output (e.g., the position of output member 340).

In the example of FIG. 3, input member 310 features a slot portion 312 that may be configured to receive a stop member 342 coupled to output portion 340. In this example, stop member 342 and slot portion 312 may restrict the relative positions of input member 310 and output member 340.

The example of FIG. 3 also features a damping system 356. Damping system 356 may reduce the amplitude of oscillations of output member 340 during operation of MR fluid boost actuator 300. In the example of FIG. 3, damping system 356 features a magnetic induction coil that communicates with a damping winding disposed between driving member 320 and driven member 330. In this example embodiment, current induced by magnetic induction drives a winding that applies a magnetic field against MR fluid 325. Teachings of certain embodiments recognize that other damping systems may also be used, such as current dampers and fluid dampers (e.g, using fluid moving through vanes or orifices).

Figure 4:
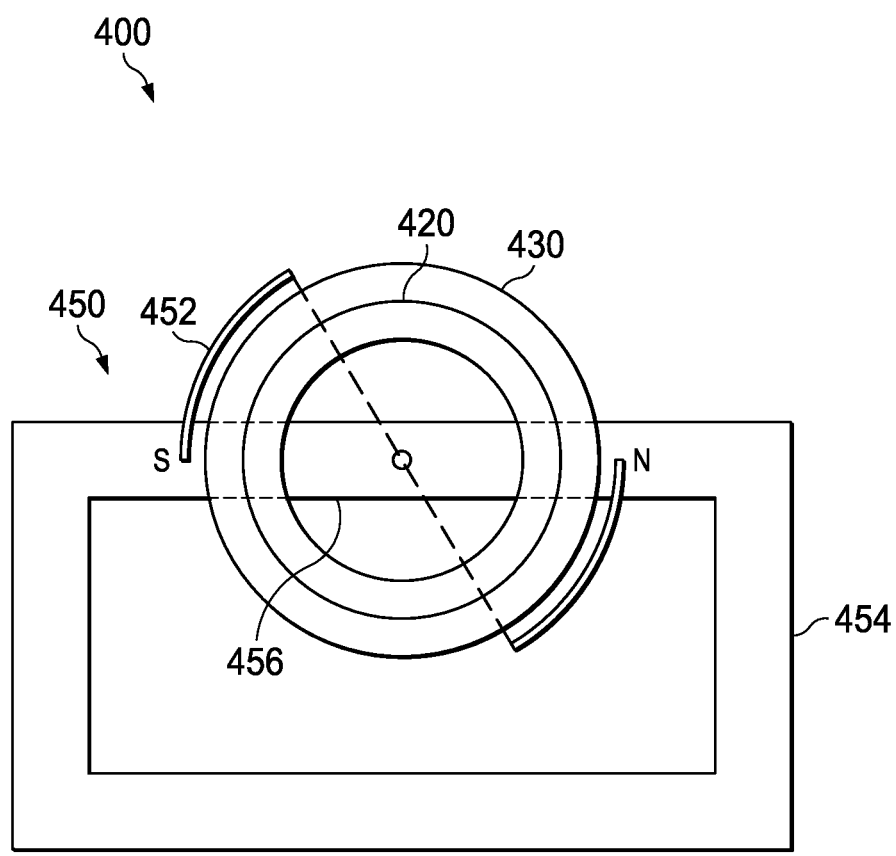
FIG. 4 shows another MR fluid boost actuator according to one example embodiment that may be incorporated into a flight control system such as the example flight control system of FIG. 2A.

Teachings of certain embodiments recognize that magnetic field system 350 represents one example of a mechanism for changing the viscosity of MR fluid in an MR fluid boost actuator such as the example MR fluid boost actuator 300 of FIG. 3. For example, FIG. 4 shows a conceptual view of an MR fluid boost actuator 400 according to one example embodiment. MR fluid boost actuator 400 features an input member 410 (not shown), a driving member 420, a driven member 430, an output member 440 (not shown), and a magnetic field system 450, which includes a moveable magnetic shunt 452, a magnet 454 (which may represent, for example, a permanent magnet, an electromagnetic, or any other suitable magnet), and an armature 456. One example of driving member 420 may include the driving member 320 of FIG. 3, and one example of driven member 430 may include the driven member 330 of FIG. 3.

In the example of FIG. 4, input member 410 may be coupled to moveable magnetic shunt 452, and output member 440 may be coupled to driven member 430. MR fluid 425 (not shown) may be disposed in a shear area between driving member 420 and driven member 430. In some embodiments, MR fluid boost actuator 400 may also include a damping system (not shown), such as the damping system 356 of FIG. 3.

In operation, according to one example embodiment, input member 410 rotates shunt 452 in and out of the fixed magnetic field generated by magnet 454 such that shunt 452 varies the magnetic field strength across the MR fluid shear area between magnet 454 and armature 456. Varying the magnetic field strength across this MR fluid shear area changes the viscosity of MR fluid 425, thereby varying the transfer of torque between driving member 420 and driven member 430.

In the example embodiment of FIG. 4, movement of the shunt 452 and/or movement of the armature 456 may vary the magnetic field strength proportionally to the error between the mechanical input and the mechanical output such that the position error between the mechanical output relative to the input increases the force output of MR fluid boost actuator 400. The increase in force may move the output position towards the input position. As the output position approaches the input position, the original shunt position may be reestablished, thereby reducing the output movement of MR fluid boost actuator 400. Similarly, load forces that disturb the position of the output may move the output position away from the shunt, thereby increasing the force output and acting to correct the output position error.

Figure 5:
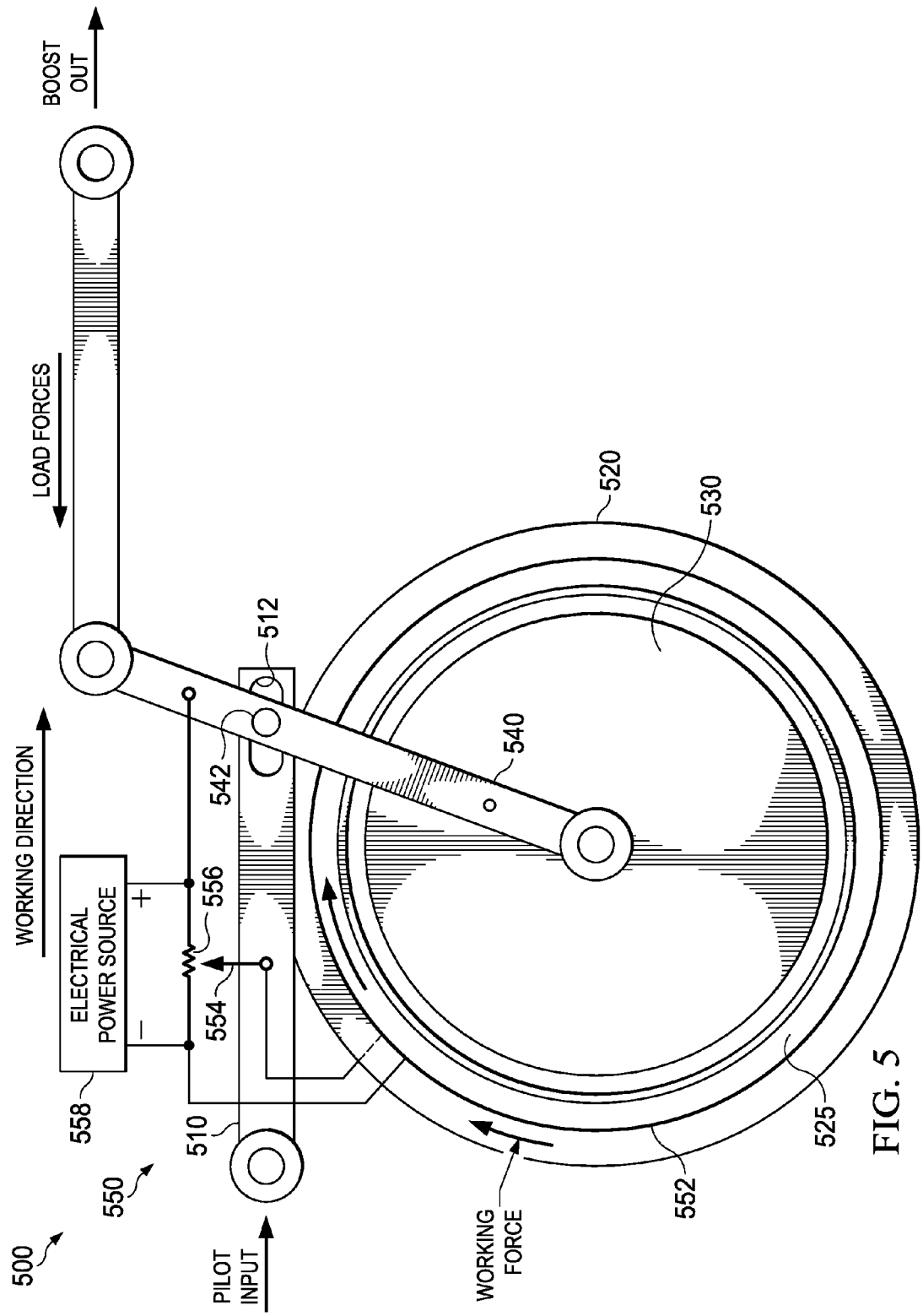
FIG. 5 shows yet another MR fluid boost actuator according to one example embodiment that may be incorporated into a flight control system such as the example flight control system of FIG. 2A.

FIG. 5 shows an MR fluid boost actuator 500 according to another example embodiment. MR fluid boost actuator 500 features an input member 510, a driving member 520, a driven member 530, an output member 540, and a magnetic field system 550, which includes a magnetic circuit 552 (e.g., an electrical winding), a wiper 554, a resistor 556 (which, in combination with wiper 554, may represent a potentiometer or rheostat), and an electrical power source 558. MR fluid 525 (as well as carrier fluid) may be disposed between driving member 520 and driven member 530.

In operation, according to one example embodiment, a power source (not shown) causes driving member 520 to rotate. MR fluid 525 transmits at least some rotational energy (torque) to driven member 530, thereby causing driven member 530 to rotate. Magnetic field system 550 subjects MR fluid 525 to a magnetic field that, if changed, may change the viscosity of MR fluid 525. Changing the viscosity of MR fluid 525, in turn, may change the amount of rotational energy transferred from driving member 520 to driven member 530. Accordingly, in this example, the amount of rotational energy transferred to driven member 530 may be regulated by controlling the amount of magnetic field generated by magnetic field system 550.

In the example of FIG. 5, the amount of magnetic field generated may depend on the relative positions of input member 510, which may move in response to an input received from a pilot or another input source, and output member 520, which may be rigidly coupled to driven member 530 and be in mechanical communication with components associated with rotor system 110. In this example, wiper 554 is coupled to input member 510, and resistor 556 is coupled to output member 540. Magnetic circuit 552 is disposed about the MR fluid 525, with one side of the magnetic circuit 552 being in electrical communication with an electrical return and the other side of the magnetic circuit 552 being in electrical communication with resistor 556.

When input member 510 and output member 540 move wiper 554 and resistor 556 closer together or further part, resistor 556 provides a larger or smaller resistance. In response, magnetic field system 550 may generate a larger or smaller magnetic field that changes the viscosity of MR fluid 325. In the example of FIG. 5, resistor 556 may provide non-linear resistance based on the position of wiper 554 in an effort to linearize the winding voltage versus mechanical error function.

Accordingly, teachings of certain embodiments recognize that MR fluid boost actuator 500 may control the amount of output force based on movements of input member 510 and output member 540. In this manner, MR fluid boost actuator 500 may operate as a feedback control loop by changing the magnetic field based on a position "error" between the input (e.g., the position of input member 510) and the output (e.g., the position of output member 540).

In the example of FIG. 5, input member 510 features a slot portion 512 that may be configured to receive a stop member 542 coupled to output portion 540. In this example, stop member 542 and slot portion 512 may restrict the relative positions of input member 510 and output member 540. In some embodiments, MR fluid boost actuator 500 may also include a damping system (not shown), such as the damping system 356 of FIG. 3.

Although each of the example MR fluid boost actuators 300, 400, and 500 may operate as unidirectional output devices, teachings of certain embodiments recognize the capability for bi-directional control. For example, in some embodiments, two MR fluid boost actuators may operate in opposing directions to provide bi-directional control.

In addition, teachings of certain embodiments recognize the capability to add additional components capable of adding or subtracting current that is applied to the MR fluid. As one example, although examples such as the example actuators 300 and 500 of FIGS. 3 and 5 only show single electrical windings, teachings of certain embodiments recognize that additional windings may be provided to add or subtract to the current being applied to the MR fluid.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
    a body;
    a power train coupled to the body and comprising an engine and a drive shaft coupled to the engine;
    a main rotor system coupled to the power train, the main rotor system comprising at least one main rotor blade;
    a pilot input device; and
    a boost actuator in mechanical communication between the pilot input device and the main rotor system, the boost actuator comprising:
        an input member configured to receive an input from the pilot input device;
        a driving member configured to receive mechanical energy from a power source;
        a driven member;
        a magnetorheological (MR) fluid disposed between the driving member and the driven member and configured to transmit a variable amount of mechanical energy from the driving member to the driven member;
        an output member coupled to the driven member; and a magnetic field system comprising a first device coupled to one of the input member and the output member, a second device coupled to the other of the input member and the output member, and a magnetic component configured to deliver a magnetic field towards the MR fluid, the strength of magnetic field delivered to the MR fluid varying based on the relative positions of the first and second devices.

2. The rotorcraft of claim 1, wherein the magnetic component comprises a circuit operable to deliver a magnetic field.

3. The rotorcraft of claim 1, wherein the first device comprises a circuit in electrical communication with the magnetic component.

4. The rotorcraft of claim 3, wherein the first device is coupled to the input member.

5. The rotorcraft of claim 3, wherein the second device comprises a magnet.

6. The rotorcraft of claim 1, further comprising a stop member coupled to the output portion, wherein the input member features an opening therethrough configured to receive the stop member such that the stop member and the opening may restrict relative positions of the input member and the output member.

7. The rotorcraft of claim 1, further comprising a damping system disposed proximate to the magnetic field system and configured to reduce the amplitude of oscillations of output member 340 by applying a damping magnetic field towards the magnetic field system.

8. The rotorcraft of claim 1, the magnetic field system further comprising a magnetic shunt at least partially disposed between the magnetic field circuit and the MR fluid such that movement of the shunt varies the strength of magnetic field delivered to the MR fluid.

9. The rotorcraft of claim 8, wherein the magnetic shunt is in mechanical communication with the first device and the second device such that the magnetic shunt varies the magnetic field strength delivered to the MR fluid in proportion to the error between the input member and the output member.

10. The rotorcraft of claim 1, wherein the first device comprises an electrical wiper and the second device comprises a resistor.

11. A boost actuator comprising:
an input member configured to receive an input from a pilot input device;
a driving member configured to receive mechanical energy from a power source;
a driven member;
a magnetorheological (MR) fluid disposed between the driving member and the driven member and configured to transmit a variable amount of mechanical energy from the driving member to the driven member;
an output member coupled to the driven member; and
a magnetic field system comprising a first device coupled to one of the input member and the output member, a second device coupled to the other of the input member and the output member, and a magnetic component configured to deliver a magnetic field towards the MR fluid, the strength of magnetic field delivered to the MR fluid varying based on the relative positions of the first and second devices.

12. The boost actuator of claim 11, wherein the magnetic component comprises a circuit operable to deliver a magnetic field.

13. The boost actuator of claim 11, wherein the first device comprises a circuit in electrical communication with the magnetic component, and the second device comprises a magnet.

14. The boost actuator of claim 11, further comprising a stop member coupled to the output portion, wherein the input member features an opening therethrough configured to receive the stop member such that the stop member and the opening may restrict relative positions of the input member and the output member.

15. The boost actuator of claim 11, further comprising a damping system disposed proximate to the magnetic field system and configured to reduce the amplitude of oscillations of output member 340 by applying a damping magnetic field towards the magnetic field system.

16. The boost actuator of claim 11, the magnetic field system further comprising a magnetic shunt at least partially disposed between the magnetic field circuit and the MR fluid such that movement of the shunt varies the strength of magnetic field delivered to the MR fluid.

17. The boost actuator of claim 16, wherein the magnetic shunt is in mechanical communication with the first device and the second device such that the magnetic shunt varies the magnetic field strength delivered to the MR fluid in proportion to the error between the input member and the output member.

18. The boost actuator of claim 11, wherein the first device comprises an electrical wiper and the second device comprises a resistor.

19. A method of provided boosted actuation to an aircraft flight control device, comprising:
receiving an input from a pilot input device via a mechanical input member;
providing mechanical energy to a driving member of a controlled-slippage actuator; and
varying the strength of a magnetic field applied to a magnetorheological (MR) fluid disposed between the driving member and a driven member of the controlled-slippage actuator based on the relative positions of the mechanical input member and a mechanical output member that is in mechanical communication with the driven member and the aircraft flight control device.

20. The method of claim 19, wherein the aircraft flight control device is a main rotor system device of a rotorcraft.

* * * * *